United States Patent
Liao et al.

(10) Patent No.: US 8,780,587 B2
(45) Date of Patent: Jul. 15, 2014

(54) SWITCHING REGULATOR AND CONTROL CIRCUIT AND CONTROL METHOD THEREOF

(71) Applicants: Chia-Wei Liao, Zhubei (TW); Jing-Meng Liu, Zhubei (TW); Leng-Nien Hsiu, Zhubei (TW); Pei-Yuan Chen, Taoyuan (TW)

(72) Inventors: Chia-Wei Liao, Zhubei (TW); Jing-Meng Liu, Zhubei (TW); Leng-Nien Hsiu, Zhubei (TW); Pei-Yuan Chen, Taoyuan (TW)

(73) Assignee: Richtek Technology Corporation, R.O.C., Zhubei, Hsinchu (TW)

( * ) Notice: Subject to any disclaimer, the term of this patent is extended or adjusted under 35 U.S.C. 154(b) by 19 days.

(21) Appl. No.: 13/674,824

(22) Filed: Nov. 12, 2012

(65) Prior Publication Data
US 2013/0114308 A1    May 9, 2013

(30) Foreign Application Priority Data
Jan. 12, 2011    (TW) ............................. 100144137 A (51) Int. Cl.
*H02M 3/335*    (2006.01)
*H02M 1/42*    (2007.01)
(52) U.S. Cl.
CPC .......... *H02M 3/33507* (2013.01); *Y02B 70/126* (2013.01); *H02M 1/4258* (2013.01)
USPC .................. 363/21.01; 363/21.08; 363/21.16; 363/97
(58) Field of Classification Search
USPC ............ 363/21.04, 21.06, 21.08, 21.09, 21.1, 363/21.11, 21.12, 21.15, 21.16, 21.17, 363/21.18, 97; 323/205, 207, 299
See application file for complete search history.

(56) References Cited

U.S. PATENT DOCUMENTS

| | | | |
|---|---|---|---|
| 6,373,734 B1 * | 4/2002 | Martinelli | 363/89 |
| 8,331,113 B2 * | 12/2012 | Tang et al. | 363/24 |
| 2012/0075898 A1 * | 3/2012 | Sigamani et al. | 363/131 |

* cited by examiner

*Primary Examiner* — Gary L Laxton
(74) *Attorney, Agent, or Firm* — Tung & Associates (57) ABSTRACT

A control circuit of a switching regulator, which controls rectified power within a predetermined range, detects an input voltage and an input current to generate a voltage detection signal and a current detection signal respectively, and the voltage detection signal and the current detection signal are multiplied by one the other to generate a power index. The control circuit generates an error signal according to the power index and a reference signal. A low-pass-filter filters a high frequency band in the process. A control signal generation circuit of the control circuit generates a control signal according to the error signal. And a driver circuit of the control circuit generates an operation signal according to the control signal, for switching a power switch to convert the rectified power to an output voltage.

33 Claims, 7 Drawing Sheets

SWITCHING REGULATOR AND CONTROL CIRCUIT AND CONTROL METHOD THEREOF

CROSS REFERENCE

The present invention claims priority to TW 100144137, filed on Dec. 1, 2011.

BACKGROUND OF THE INVENTION

1. Field of Invention

The present invention relates to a switching regulator, and a control circuit and method for controlling a switching regulator. Particularly, it relates to such switching regulator, control circuit, and control method which control a rectified power (an input power after rectification) within a predetermined range.

2. Description of Related Art

The output power or output current of a switching regulator is preferably controlled within a predetermined range in some applications of the switching regulator. To control the output power or output current within a predetermined range, in prior art, it is required to detect the output voltage and the output current and feedback such information to control the switching regulator.

One of the drawbacks of the aforementioned prior art is that, the detected signals related to the output voltage and the output current can not be directly electrically connected to a control circuit in an isolated switching regulator, such as an isolated AC/DC conversion circuit. The detected signals may be delivered to the control circuit by an indirect way, such as by an opto-coupling circuit, but this increases the cost, and the indirect opto-coupling is more likely to generate errors as compared to direct electrical connection.

In view of the foregoing, the present invention provides a switching regulator, and a control circuit and method for controlling a switching regulator, which detects an input voltage and an input current, and controls the rectified power within a predetermined range by a direct way, such that the output power or output current of the switching regulator may be substantially constant.

SUMMARY OF THE INVENTION

A first objective of the present invention is to provide a switching regulator.

A second objective of the present invention is to provide a control circuit for controlling a switching regulator.

A third objective of the present invention is to provide a control method for controlling a switching regulator.

To achieve one or more of the above and other objectives, from one perspective, the present invention provides a switching regulator, comprising: a rectifier circuit, for converting an AC power to a rectified power, wherein the rectified power includes an input voltage and an input current; a transformer, which includes a primary winding and a secondary winding, wherein the primary winding is for receiving the rectified power, and the secondary winding is for generating an output voltage; a power switch, which is coupled to the primary winding, for switching according to an operation signal to convert the rectified power to the output voltage; and a control circuit, which is coupled to the power switch, for generating the operation signal according to the rectified power to control the rectified power within a predetermined range. The control circuit includes: a power index generation circuit, for generating a power index according to the input voltage and the input current; an amplifier circuit, for generating an error signal according to the power index and a first reference signal; a control signal generation circuit, for generating a control signal according to the error signal; a driver circuit, for generating the operation signal according to the control signal; and a low-pass-filter (LPF) circuit, which is coupled to or integrated in the power index generation circuit or the amplifier circuit, for filtering a high frequency band.

From another perspective, the present invention provides a control circuit of a switching regulator, wherein the switching regulator includes a power switch for switching to convert a rectified power to an output voltage, and wherein the rectified power includes an input voltage and an input current, the control circuit being for controlling the rectified power within a predetermined range, the control circuit comprising: a power index generation circuit, for generating a power index according to the input voltage and the input current; an amplifier circuit, for generating an error signal according to the power index and a first reference signal; a control signal generation circuit, for generating a control signal according to the error signal, to control the power switch; and a low-pass-filter (LPF) circuit, which is coupled to or integrated in the power index generation circuit or the amplifier circuit, for filtering a high frequency band.

In the aforementioned switching regulator or control circuit for controlling a switching regulator, the power index generation circuit preferably includes: an input voltage detection circuit, for detecting the input voltage to generate an input voltage detection signal; an input current detection circuit, for detecting the input current to generate an input current detection signal; and a multiplier circuit, for multiplying the input voltage detection signal and the input current detection signal to generate the power index.

The aforementioned control circuit preferably further includes an output voltage detection circuit, for generating an output voltage detection signal related to the output voltage; and a compensation circuit, for generating the first reference signal which is inputted to the amplifier circuit according to the output voltage detection signal and a second reference signal.

In the aforementioned switching regulator and the control circuit, the compensation circuit preferably includes: a first voltage-to-current conversion circuit, for generating a first current signal according to the output voltage detection signal; and a first current-to-voltage conversion circuit, for generating a first voltage adjustment signal according to the first current signal, wherein the first voltage adjustment signal is combined with the second reference signal to generate the first reference signal.

The aforementioned control circuit may include an input voltage conversion circuit, for adjusting the first reference signal according to the input voltage. The input voltage conversion circuit may include: an input voltage detection circuit, for detecting the input voltage to generate an input voltage detection signal; a second voltage-to-current conversion circuit, for generating a second current signal according to the input voltage detection signal; and a second current-to-voltage conversion circuit, for generating a second voltage adjustment signal according to the second current signal, wherein the second voltage adjustment signal is combined with the second reference signal to generate the first reference signal.

The aforementioned compensation circuit may include a first voltage-to-current conversion circuit, for generating a first current signal according to the output voltage detection signal; a first current-to-voltage conversion circuit, for generating a first voltage adjustment signal according to the first current signal; an input voltage detection circuit, for detecting the input voltage to generate an input voltage detection signal; a second voltage-to-current conversion circuit, for generating a second current signal according to the input voltage detection signal; and a second current-to-voltage conversion circuit, for generating a second voltage adjustment signal according to the second current signal, wherein the first voltage adjustment signal, the second voltage adjustment signal, and the second reference signal are combined to generate the first reference signal.

The aforementioned control circuit preferably further includes: a zero current detection circuit, for detecting a timing when an output current of the switching regulator is zero to generate a zero current detection signal; and a boundary conduction mode (BCM) control circuit, for adjusting the control signal according to the zero current detection signal to determine a boundary conduction timing of the power switch.

The aforementioned control circuit preferably further includes: a modulation circuit, for generating a modulated error signal according to the error signal and a voltage detection signal related to the input voltage; wherein the control signal generation circuit generates the control signal according to the modulated error signal and a current detection signal related to the input current.

From another perspective, the present invention provides a control method for controlling a switching regulator, wherein the switching regulator is for converting a rectified power to an output voltage, and wherein the rectified power includes an input voltage and an input current, the control method comprising: generating a power index according to the input voltage and the input current; comparing the power index and a first reference signal to generate an error signal; generating a control signal for controlling the power switch according to the error signal, such that the rectified power is within a predetermined range; and filtering a high frequency band in any one or more or between any two of the above steps.

In one embodiment, the control method for controlling the switching regulator preferably further includes: generating an output voltage detection signal according to the output voltage; and generating the first reference signal according to the output voltage detection signal and a second reference signal.

In one embodiment, the step of generating the first reference signal preferably includes: generating a first converted current signal according to the output voltage detection signal; generating a converted voltage signal according to the converted current signal; and combining the converted voltage signal with the second reference signal to generate the first reference signal.

In another embodiment, the step of generating the first reference signal preferably further includes: generating a second converted current signal according to the input voltage; generating a second converted voltage signal according to the second converted current signal; and combining the second converted voltage signal with the second reference signal to generate the first reference signal.

The step of generating the first reference signal may include: generating a first converted current signal according to the output voltage; generating a first converted voltage signal according to the first converted current signal; generating a second converted current signal according to the input voltage; generating a second converted voltage signal according to the second converted current signal; and combining the first converted voltage signal, the second converted voltage signal, and the second reference signal to generate the first reference signal.

In another embodiment, the control method for controlling the switching regulator may further include: detecting a timing when an output current of the switching regulator is zero to generate a zero current detection signal; and adjusting the control signal according to the zero current detection signal to determine a boundary conduction timing.

In another embodiment, the step of generating the control signal preferably further includes: performing a modulation procedure to generate a modulated error signal according to the error signal and a voltage detection signal related to the input voltage; and generating the control signal according to the modulated error signal and a current detection signal related to the input current.

The objectives, technical details, features, and effects of the present invention will be better understood with regard to the detailed description of the embodiments below.

DESCRIPTION OF THE PREFERRED EMBODIMENTS

Figure 1:
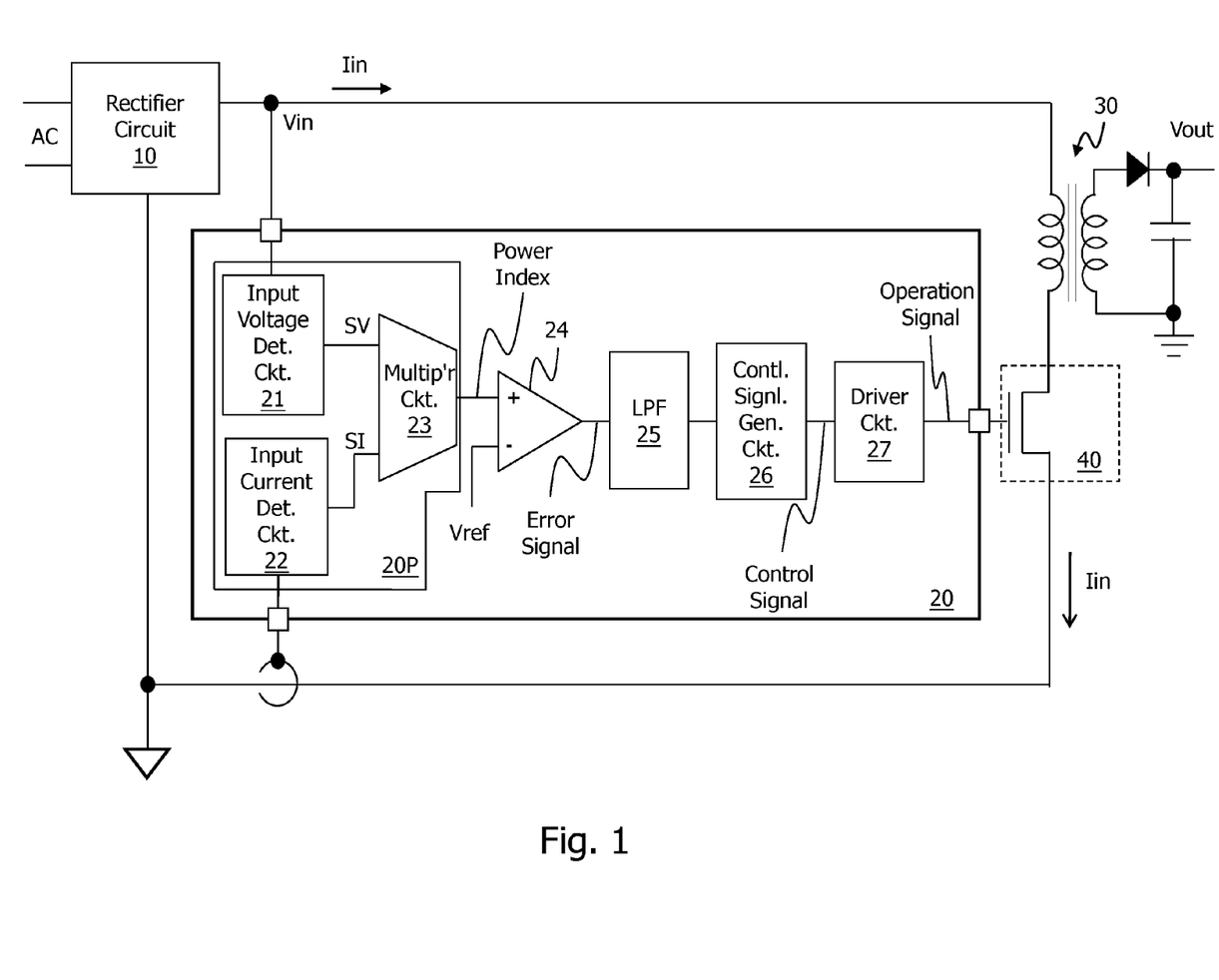
FIG. 1 shows a first embodiment of the present invention.

FIG. 1 shows a first embodiment of the present invention. As shown in the figure, a switching regulator includes a rectifier circuit 10, a control circuit 20, a transformer 30, and a power switch 40. The rectifier circuit 10 is for example but not limited to a bridge rectifier circuit (not shown in detail), for converting an AC power with positive and negative sinusoidal waves to a rectified power with only positive semi-sinusoidal waves, wherein the rectified power includes an input voltage Vin and an input current Iin. The transformer 30 includes a primary winding and a secondary winding, wherein the primary winding receives the rectified power, and the secondary winding generates an output voltage Vout. The power switch 40 is coupled to the primary winding, and it switches according to an operation signal outputted from the control circuit 20, such that the rectified power is converted to the output voltage Vout. The control circuit 20 can control the rectified power within a predetermined range. In one embodiment, the control circuit 20 as a whole is integrated into an integrated circuit (IC) chip; in another embodiment, it is partially integrated to an IC chip, for example but not limited to an IC chip excluding all or part of an input voltage detection circuit 21, input current detection circuit 22, and driver circuit 27. As shown in the figure, the control circuit 20 is coupled to the rectifier circuit 10 and the power switch 40, and it generates the operation signal according to the input voltage Vin and input current Iin of the rectified power. The operation signal operate the power switch 40.

Referring to FIG. 1, the control circuit 20 includes: a power index generation circuit 20P, an amplifier circuit 24, a low-pass-filter (LPF) circuit 25, a control signal generation circuit 26, and a driver circuit 27. The power index generation circuit 20P for example includes the input voltage detection circuit 21, the input current detection circuit 22, and a multiplier circuit 23. The input voltage detection circuit 21 is coupled to the rectifier circuit 10, to detect the input voltage and generate a voltage detection signal SV. The input current detection circuit 22 is coupled to the rectifier circuit 10, to detect the input current Iin and generate a current detection signal SI. The multiplier circuit 23 generates a power index for example by multiplying the voltage detection signal SV and the current detection signal SI. The amplifier circuit 24 compares the power index and a reference signal Vref, and generates an error signal according to the comparison result. The LPF circuit 25 provides a function of filtering a high frequency band. The LPF circuit 25 for example is coupled to the amplifier circuit 24 as shown in the figure, to filter the high frequency band of the error signal. However, the present invention is not limited to this. The LPF circuit 25 of the present invention may be coupled to the multiplier circuit 23 to filter the high frequency band of the power index, or coupled to the input voltage detection circuit 21 in some specific conditions to filter the high frequency band of the voltage detection signal SV, or coupled to the input current detection circuit 22 in some specific conditions to filter the high frequency band of the current detection signal SI, or integrated in the amplifier circuit 24, the multiplier circuit 23, the input voltage detection circuit 21 and/or the input current detection circuit 22, or embodied by a combination of two or more of the above. The LPF circuit 25 may be arranged in various ways to filter the high frequency band before the control circuit 20 outputs the operation signal. The control signal generation circuit 26 generates the control signal according to the error signal. The control signal generation circuit 26 for example may be a pulse width modulation (PWM) generation circuit, for generating a PWM signal; or, in another embodiment, the control signal generation circuit 26 for example may be a one-shot circuit, for generating a one-shot signal when the error signal reaches a predetermined level, i.e., a constant ON time structure. The control signal generation circuit 26 also may be a pulse width or frequency modulation circuit in other forms, such as a constant OFF time structure, etc. The driver circuit 27 converts the control signal to the operation signal having a proper level to drive the power switch 40, such that the rectified power is converted to the output voltage Vout by the transformer 30. If the level of the control signal already has enough driving capability to drive the power switch 40, the driver circuit 27 may be omitted. In the present invention, the switching regulator shown in FIG. 1 balances the power index at the level of the reference signal Vref by a close loop mechanism, such that the rectified power is controlled within a predetermined range. Because the output power is substantially equal to the rectified power multiplied by a conversion efficiency, and the conversion efficiency is a parameter which can be obtained, the output power is under control.

Figure 2A:
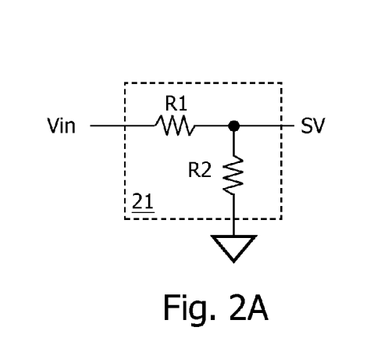
FIGS. 2A and 2B show a second and a third embodiments of the present invention.
Figure 2B:
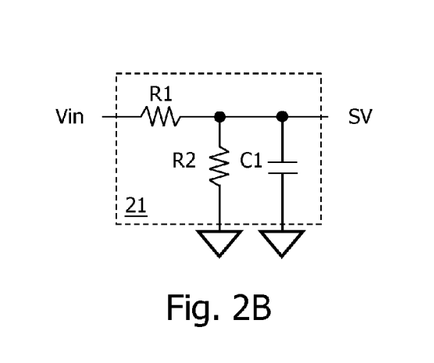

FIGS. 2A and 2B show a second and a third embodiments of the present invention respectively. The second embodiment shows one embodiment of the input voltage detection circuit 21. The input voltage detection circuit 21 for example is, but not limited to, a division circuit shown in FIG. 2A, which includes resistors R1 and R2 connected in series between the input voltage Vin and the ground level, and the voltage drop across the resistor R2 is obtained as the voltage detection signal SV. The third embodiment shown in FIG. 2B is another embodiment of the input voltage detection circuit 21. This embodiment is different from the second embodiment in that, the third embodiment further includes a capacitor C1 for filtering noises and obtaining an average signal of the voltage across the resistor R2, wherein the capacitor C1 is coupled with the resistor R2 in parallel between the node for generating the voltage detection signal SV and the ground level.

Figure 3A:
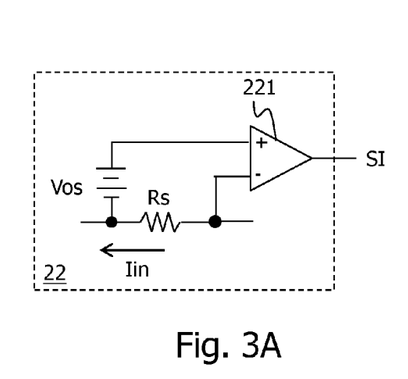
FIGS. 3A and 3B show a fourth and a fifth embodiments of the present invention.
Figure 3B:
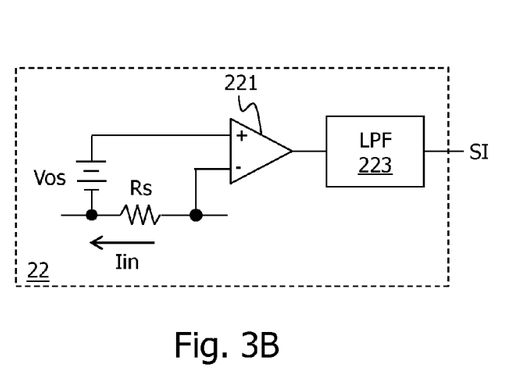

FIGS. 3A and 3B show a fourth and a fifth embodiments of the present invention respectively. The fourth embodiment shows one embodiment of the input current detection circuit 22. The input current detection circuit 22 for example is, but not limited to, a circuit shown in FIG. 2A, which includes a resistor Rs, an amplifier circuit 221, and a bias source which provides a bias Vos. The resistor Rs is connected in series in the loop of the input current Iin. The amplifier circuit 221 is coupled to both ends of the resistor Rs, and the voltage across the resistor Rs is inputted to the amplifier circuit 221 to generate the current detection signal SI. As shown in FIG. 3A, the current detection signal SI may be adjusted by the bias Vos, which for example may be provided between the two input terminals of the amplifier circuit 221 (the bias Vos may be any desired number including zero). The bias Vos does not have to be a physical device, but may be an internal bias inside the amplifier circuit 221. The fifth embodiment shows another embodiment of the input current detection circuit 22. This embodiment is different from the fourth embodiment in that, an LPF circuit 223 is provided in the input current detection circuit 22 for filtering the high frequency band noises.

Figure 4:
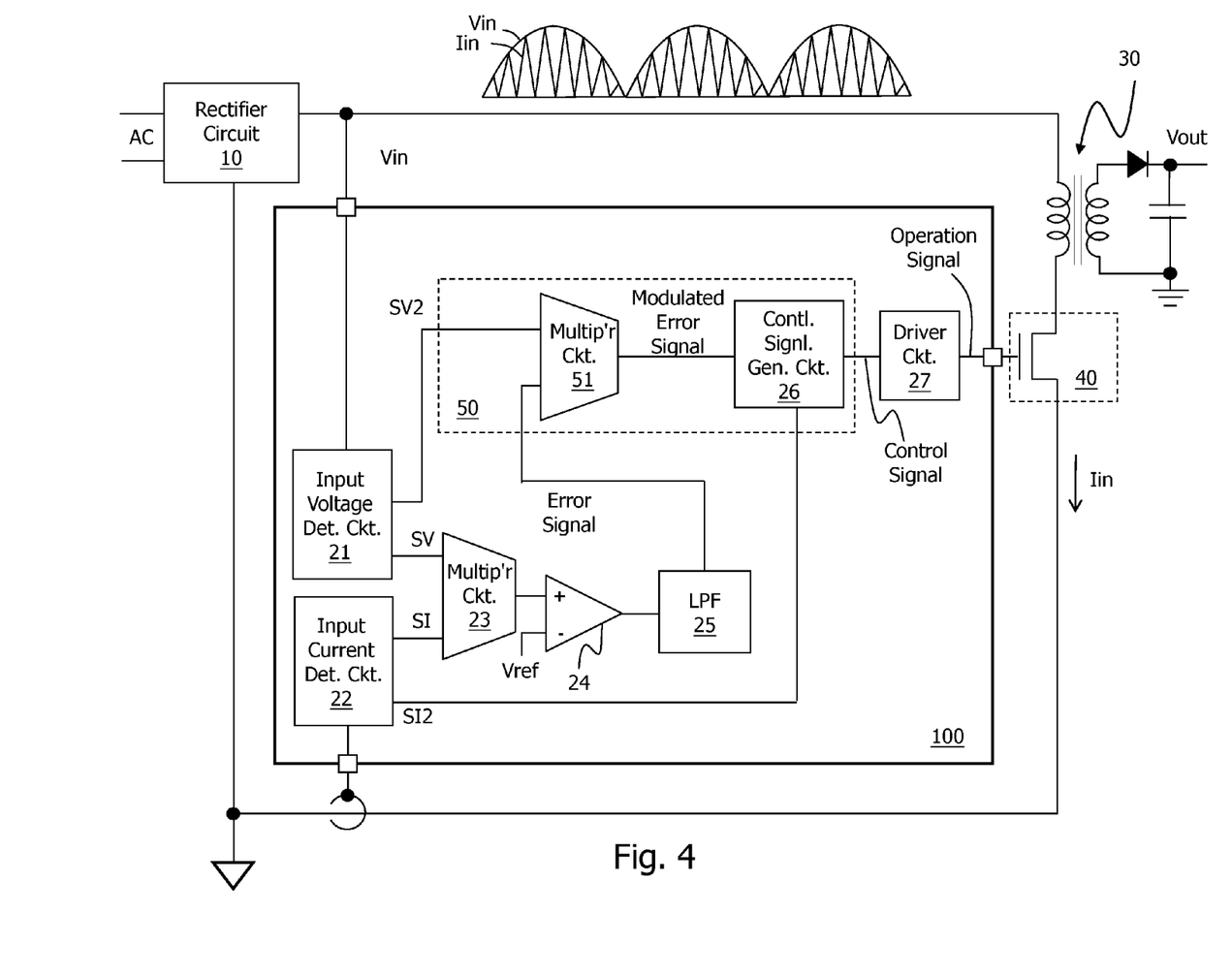
FIG. 4 shows a sixth embodiment of the present invention.

FIG. 4 shows a sixth embodiment of the present invention. This embodiment is different from the first embodiment in that, the control circuit 100 of this embodiment further includes a modulation circuit, which is for example but not limited to a multiplier circuit 51 as shown in the figure. The multiplier circuit 51 receives a voltage detection signal SV2 and the error signal, and multiplies them to generate a modulated error signal. The voltage detection signal SV2 is, for example but not limited to, the same as the voltage detection signal SV. The control signal generation circuit 26 for example receives the modulated error signal and a second current detection signal SI2, to generate the control signal. The second current detection signal SI2 is, for example but not limited to, the same as the current detection signal SI.

Note that the multiplier circuit 51 and the control signal generation circuit 26 form a power factor correction (PFC) circuit 50. The function of the multiplier circuit 51 is to adjust the phase of the error signal by modulating the voltage detection signal in the error signal, but keeping the DC average value of the error signal, such that the DC average value of the modulated error signal is substantially the same as that of the error signal, while the waveform and the phase of the modulated error signal is substantially the same as that of the input voltage Vin. The control signal generation circuit 26 adaptively adjusts the operation signal according to the relationship between the peak value of the second current detection signal SI2 and the modulated error signal, such that the peak of the input current Iin will be adaptively modulated to be conformed to the waveform (in phase) of the input voltage Vin, as shown by the waveforms at the upper side of the figure. The embodiment of the PFC circuit 50 is not limited to that as shown in FIG. 4, which includes the multiplier circuit 51 and the control signal generation circuit 26, but may be arranged in other ways, such as a separate PFC circuit 50 in addition to the control signal generation circuit 26, etc. The PFC circuit is well known by those skilled in the art, so details thereof are omitted here. After all, in this embodiment, the multiplier circuit 23 and the amplifier circuit 24 can control the rectified power (consequently, the output power), and the PFC circuit 50 can perform the function of power factor correction.

Figure 5:
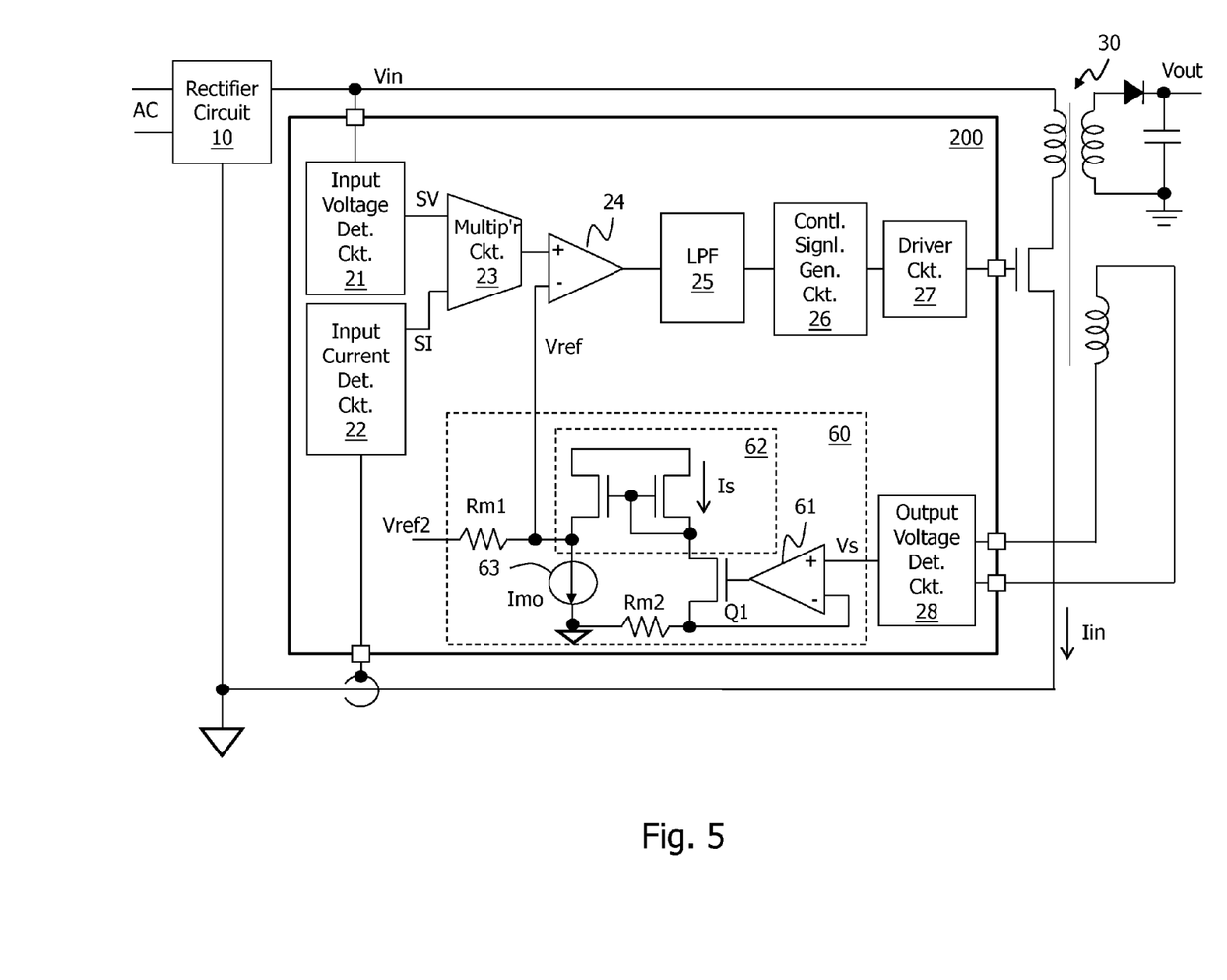
FIG. 5 shows a seventh embodiment of the present invention.

FIG. 5 shows a seventh embodiment of the present invention. This embodiment is different from the first embodiment in that, the reference signal Vref in this embodiment is variable, which is determined by a predetermined reference signal Vref2 and the output voltage Vout. More specifically, the control circuit 200 of this embodiment further includes an output voltage detection circuit 28 and a compensation circuit 60. The output voltage detection circuit 28 generates an output voltage detection signal Vs according to the output voltage Vout. The compensation circuit 60 receives the output voltage detection signal Vs and the reference signal Vref2, and generates the reference signal Vref which is inputted to the amplifier circuit 24. The output voltage detection circuit 28 for example can detect the output voltage Vout by: providing an auxiliary winding at the secondary side of the transformer 30, and obtaining the output voltage detection signal Vs according to a winding ratio of the auxiliary winding to the secondary winding.

The major function of the compensation circuit 60 is to integrate information related to the output voltage Vout into the reference signal Vref inputted to the amplifier circuit 24. As shown in the figure, the compensation circuit 60 includes, for example but not limited to, an amplifier circuit 61, a transistor Q1, a current mirror circuit 62, a current source 63, and resistors Rm1 and Rm2. The amplifier circuit 61 and the transistor Q1 form a voltage-to-current conversion circuit, which converts the output voltage detection signal Vs to a current signal Is (which is equal to Vs/Rm2 in this embodiment). The current source 63 provides a predetermined current Imo. The resistor Rm1, as a current-to-voltage conversion circuit, converts the current (Is−Imo) to a voltage Rm1*(Is−Imo), so the reference signal Vref is:

$$Vref=Vref2+Rm1*(Vs/Rm2-Imo)=Vref2+g(Vout-Vo)$$

wherein g and Vo are both controllable parameters (by circuit design). Briefly, the reference signal Vref is a function of the reference signal Vref2 and the output voltage Vout. That is, when controlling the rectified power within a predetermined range, besides the input voltage Vin and input current Iin, the output voltage Vout may further be considered. An example which requires the formation of the output voltage Vout is thus: when the output voltage Vout is supplied to a light emitting device circuit (not shown), a constant output current is normally required for driving the light emitting device circuit. The present invention controls the input power (i.e., the rectified power) Pin, and the output current Iout=Pout/Vout=(Pin*Eff)/Vout, wherein Pout is the output power, and Eff is the conversion efficiency. The output voltage Vout may be different for different light emitting device circuits because of variations of the forward voltages Vf of the light emitting devices in the light emitting device circuit. Therefore in order to obtain the constant output current, the output voltage Vout needs to be detected as a parameter for controlling the power switch 40, to compensate its variation.

Note that, when the control circuit 200 is integrated into an integrated circuit (IC) chip, the resistors Rm1 and Rm2 may either be integrated in the IC chip or connected as external components. Besides, the compensation circuit 60 shown in the figure is only one embodiment, not for limiting the scope of the present invention. For example, the current source 63 may be omitted (in the aforementioned equation of the reference signal Vref, the function of the predetermined current Imo is for adjusting the weighting of the variation of the output voltage Vout to the reference signal Vref, so the current source 63 may be omitted which means that the weighting is not open to adjustment). More specifically, the embodiment of the compensation circuit 60 shown in FIG. 5 detects the output voltage Vout to generate the output voltage detection signal Vs, and then converts the output voltage detection signal Vs to the current signal Is; the current signal Is is converted to a voltage signal (the voltage drop across the resistor Rm1), which is superimposed onto the reference signal Ref2. However, the compensation circuit 60 is not limited to this embodiment. For example, a mapping table may be provided for generating the reference signal Vref by directly mapping the output voltage detection signal Vs to the reference signal Vref, or by mapping the output voltage detection signal Vs to a corresponding voltage signal and superimposing the corresponding voltage signal onto the reference signal Vref2. For another example, a scaling circuit may be provided to generate a ratio voltage of the output voltage detection signal Vs, and the ratio voltage is superimposed onto the reference signal Vref2 to generate the reference signal Vref, etc.

Figure 6:
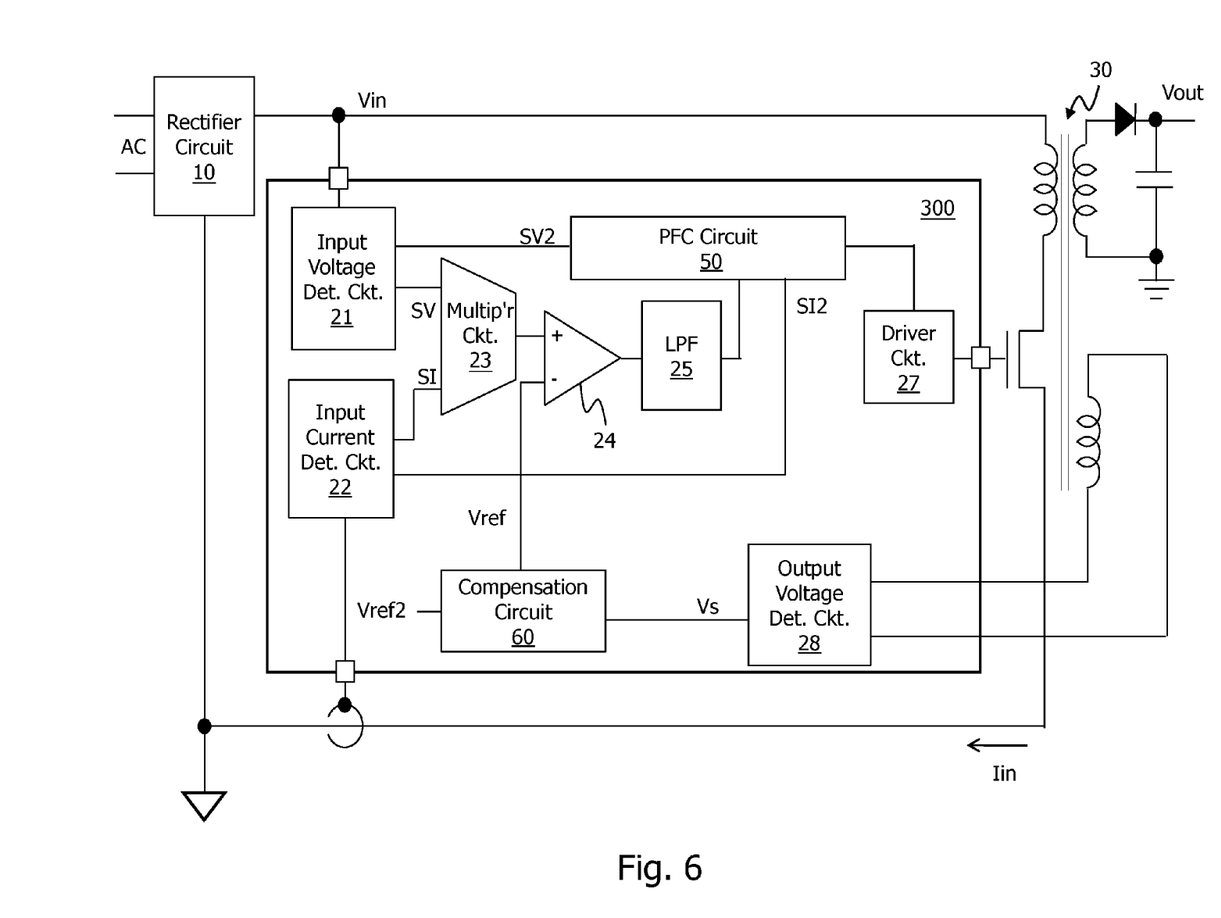
FIG. 6 shows an eighth embodiment of the present invention.

FIG. 6 shows an eighth embodiment of the present invention. This embodiment is different from the seventh embodiment in that, in this embodiment the control circuit 300 further includes the PFC circuit 50 shown in the sixth embodiment.

Figure 7:
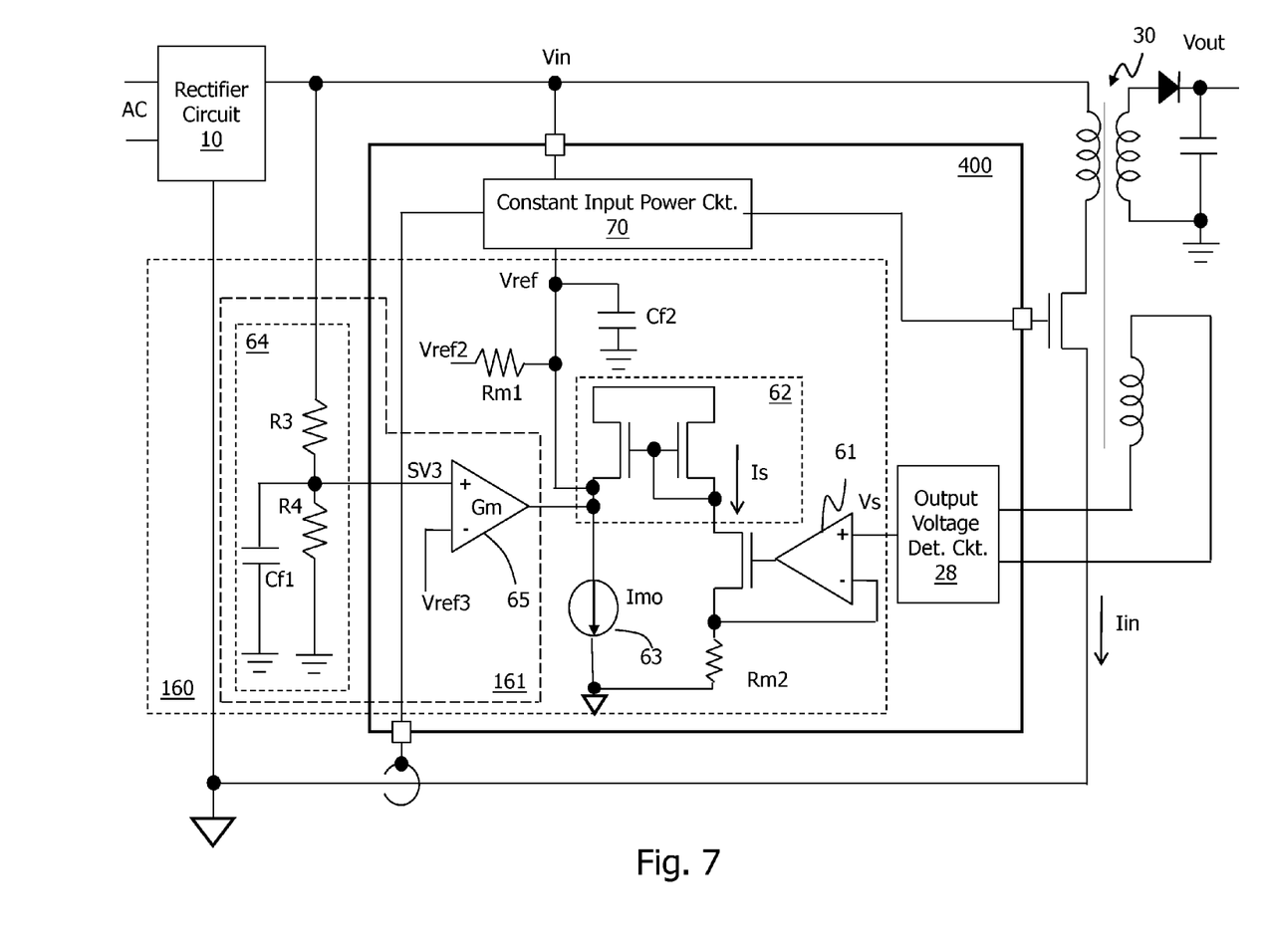
FIG. 7 shows a ninth embodiment of the present invention.

FIG. 7 shows a ninth embodiment of the present invention. In this embodiment, the constant input power circuit 70 may be one similar to the control circuit 20 of the first embodiment shown in FIG. 1, which includes: the input voltage detection circuit 21, the input current detection circuit 22, the multiplier circuit 23, the amplifier circuit 24, the LPF circuit 25, the control signal generation circuit 26, and the driver circuit 27, or one similar to the control circuit 100 of the sixth embodiment shown in FIG. 4, which further includes the PFC circuit 50 as compared to the control circuit 20. Compared to the seventh embodiment shown in FIG. 5, this embodiment further inputs information related to the input voltage Vin to the compensation circuit 160, to compensate the deviation that is not covered by the relationship of the conversion efficiency Eff and the input voltage Vin, to more precisely reflect the relationship between the output power and the input power.

More specifically, in the previous embodiments, it is assumed that the input power is substantially the same or proportional to the output power, so the slight difference between them may be ignored. Therefore, in the previous embodiments, if the rectified power (the input power) is controlled within the predetermined range, it is assumed that the output power can be controlled at a target value. However, this embodiment can more precisely control the output power (or output current) at the target value by considering the slight difference between the input power and the output power. As shown in the figure, compared to the compensation circuit 60 shown in FIG. 5, the compensation circuit 160 further includes an input voltage conversion circuit 161, which adjusts the reference signal Vref according to the input voltage Vin, and the adjusted reference signal Vref is inputted to the amplifier circuit 24 of the constant input power circuit 70. The input voltage conversion circuit 161 includes for example but not limited to an input voltage detection circuit 64 and a transconductor circuit Gm 65. The input voltage detection circuit 64 has resistors R3 and R4 connected in series between the rectifier circuit 10 and the ground level. A voltage detection signal SV3 is generated according to the voltage drop across the resistor R4. The transconductor circuit Gm 65 generates an output signal according to the voltage detection signal SV3 and a reference signal Vref3, and the output signal adjusts the reference signal Vref. The equation of the reference signal Vref is adjusted as follows, in the circuit of FIG. 7:

$$Vref=Vref2+Rm1/Rm2*Vs+Rm1*GM(SV3-Vref3)-Rm1*Imo=Vref2+a*(Vout-Vp)+b*(Vin-Vq)$$

wherein GM is a transconductance coefficient, i.e., a coefficient for converting a voltage to a current, and a, Vp, b, and Vq are parameters controllable by circuit design. Briefly, the reference signal Vref is a function of the reference signal Vref2, the output voltage Vout, and the input voltage Vin. The voltage detection signal SV3 is for example but not limited to the same as the voltage detection signal SV. Capacitors Cf1 and Cf2, which are used to filter noises in this embodiment, may also be omitted. The resistors R3 and R4 are not limited to being connected as external components as shown in the figure. One or both of them may be integrated in the IC chip. The ninth embodiment is a more general embodiment which includes variations such as: when the parameter b is zero, this embodiment becomes the seventh embodiment shown in FIG. 5; and when the parameter a is zero, this embodiment becomes one embodiment of which compensates only the input voltage Vin, and in this latter case, the output voltage detection circuit 28, the amplifier circuit 61, the current mirror circuit 62, the resistor Rm2 and/or the predetermined current source 63 may be omitted.

Note that, in the aforementioned description of the present invention, the circuits of detecting and compensating the input voltage and the output voltage are interchangeable. That is, the transconductor circuit 65 for converting the input voltage detection signal SV3 to the current signal may be changed to a circuit which is similar to a combination of the amplifier circuit 61, the current mirror 62, and the resistor Rm of the compensation circuit 60. On the other hand, the combination of the amplifier circuit 61, the current mirror 62, and the resistor Rm of the compensation circuit 60 may be changed to the transconductor circuit 65. Therefore, the present invention is not limited to the embodiments shown in the figures.

Figure 8:
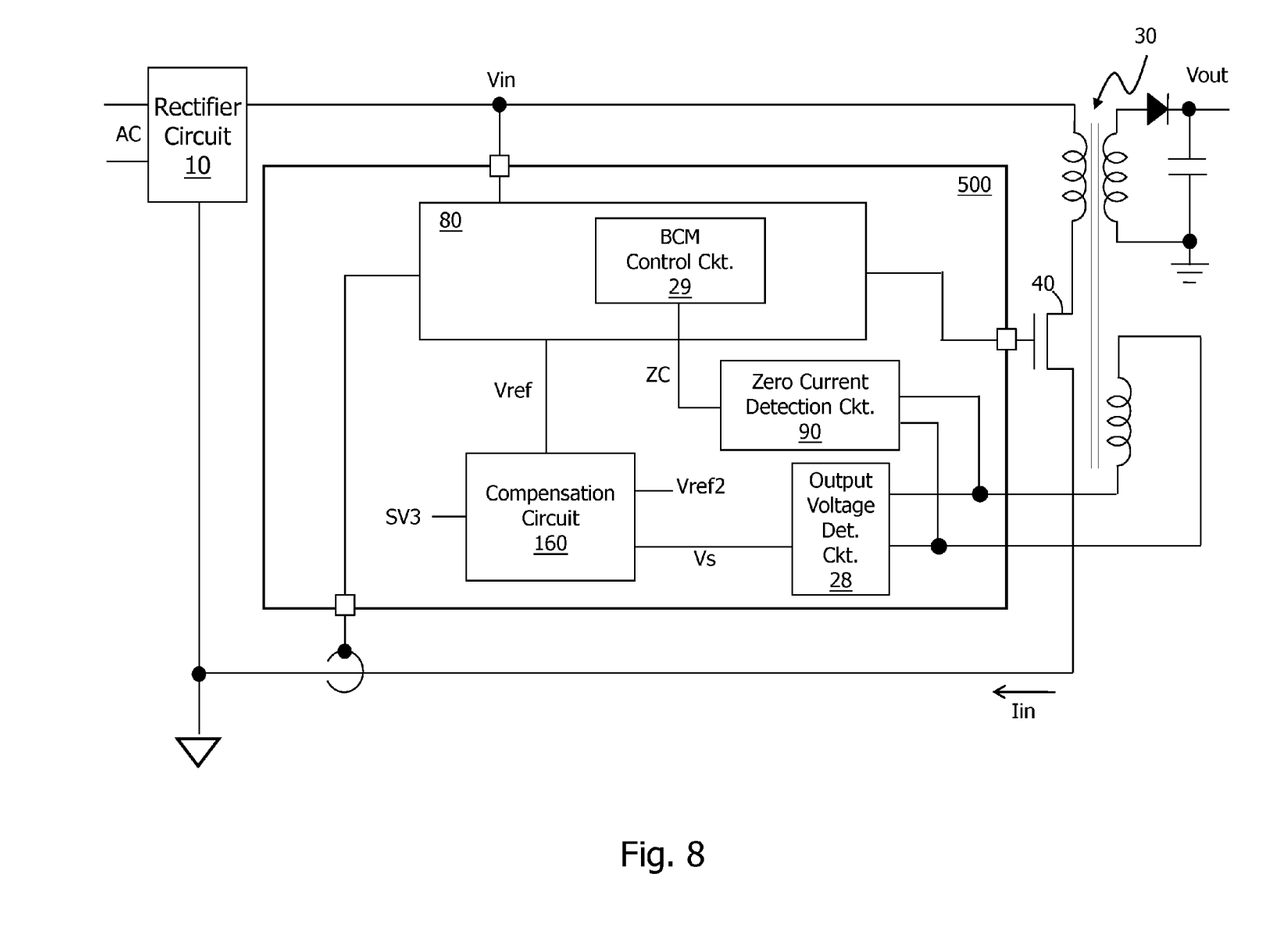
FIG. 8 shows a tenth embodiment of the present invention.

FIG. 8 shows a tenth embodiment of the present invention. In this embodiment, as compared to the constant input power circuit 70 of the ninth embodiment shown in FIG. 7, the constant input power circuit 80 further includes a zero current detection circuit 90 and a BCM circuit 29, and the constant input power circuit 80 may include or not include the PFC circuit 50. The zero current detection circuit 90 generates a zero current detection signal ZC according to the output voltage Vout. The BCM circuit 29 is, for example but not limited to, integrated in the control signal generation circuit 26; the BCM circuit 29 determines the timing of boundary conduction according to the zero current detection, and adjust the control signal accordingly, such that the switching regulator operates in the BCM. More specifically, the output current of the switching regulator increases and decreases because of the effect of the inductor. When the output current changes from decreasing to increasing before it reaches to zero (valley is not zero), this is called continuous conduction mode (CCM); when the output current starts increasing after it has stayed at zero for a period, this is called discontinuous conduction mode (DCM); and when the output current changes from decreasing to increasing exactly and immediately at zero, this is called BCM. BCM has the best efficiency especially in high voltage applications. The embodiment shown in FIG. 8 can operate in BCM by obtaining the timing when the output current reaches to zero according to the zero current detection signal ZC, and turning ON the power switch 40 at the timing. The compensation circuit of this embodiment is not limited to the compensation circuit 160 shown in FIG. 7, but it may be the compensation circuit 60 shown in FIG. 5, or the compensation circuit shown in FIG. 7 with the coefficient a being zero.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch or the like. For another example, the positive and negative input terminals of the error amplifiers or comparators are interchangeable, with corresponding amendment of the circuits processing these signals. In view of the foregoing, the spirit of the present invention should cover all such and other modifications and variations, which should be interpreted to fall within the scope of the following claims and their equivalents.

What is claimed is:

1. A switching regulator, comprising:
   a rectifier circuit, for converting an AC power to a rectified power, wherein the rectified power includes an input voltage and an input current;
   a transformer, which includes a primary winding and a secondary winding, wherein the primary winding is for receiving the rectified power, and the secondary winding is for generating an output voltage;
   a power switch, which is coupled to the primary winding, for switching according to an operation signal to convert the rectified power to the output voltage; and
   a control circuit, which is coupled to the power switch, for generating the operation signal according to the rectified power to control the rectified power within a predetermined range, the control circuit including:
      a power index generation circuit, for generating a power index according to the input voltage and the input current;
      an amplifier circuit, for generating an error signal according to the power index and a first reference signal;
      a control signal generation circuit, for generating a control signal according to the error signal;
      a driver circuit, for generating the operation signal according to the control signal;
      a low-pass-filter (LPF) circuit, which is coupled to or integrated in the power index generation circuit or the amplifier circuit, for filtering a high frequency band;
      an output voltage detection circuit, for generating an output voltage detection signal related to the output voltage; and
      a compensation circuit, for generating the first reference signal which is inputted to the amplifier circuit according to the output voltage detection signal and a second reference signal.

2. The switching regulator of claim 1, wherein the power index generation circuit includes:
   an input voltage detection circuit, for detecting the input voltage to generate an input voltage detection signal;
   an input current detection circuit, for detecting the input current to generate an input current detection signal; and
   a multiplier circuit, for multiplying the input voltage detection signal and the input current detection signal to generate the power index.

3. The switching regulator of 1, wherein the compensation circuit includes:
   a first voltage-to-current conversion circuit, for generating a first current signal according to the output voltage detection signal; and
   a first current-to-voltage conversion circuit, for generating a first voltage adjustment signal according to the first current signal, wherein the first voltage adjustment signal is combined with the second reference signal to generate the first reference signal.

4. The switching regulator of 1, wherein the compensation circuit includes:
- a first voltage-to-current conversion circuit, for generating a first current signal according to the output voltage detection signal;
- a first current-to-voltage conversion circuit, for generating a first voltage adjustment signal according to the first current signal;
- an input voltage detection circuit, for detecting the input voltage to generate an input voltage detection signal;
- a second voltage-to-current conversion circuit, for generating a second current signal according to the input voltage detection signal; and
- a second current-to-voltage conversion circuit, for generating a second voltage adjustment signal according to the second current signal, wherein the first voltage adjustment signal, the second voltage adjustment signal, and the second reference signal are combined to generate the first reference signal.

5. The switching regulator of claim 1, wherein the control circuit further includes:
- a zero current detection circuit, for detecting a timing when an output current of the switching regulator is zero to generate a zero current detection signal; and
- a boundary conduction mode (BCM) control circuit, for adjusting the control signal according to the zero current detection signal to determine a boundary conduction timing of the power switch.

6. The switching regulator of claim 5, wherein the control circuit further includes a modulation circuit, for generating a modulated error signal according to the error signal and a voltage detection signal related to the input voltage; wherein the control signal generation circuit generates the control signal according to the modulated error signal and a current detection signal related to the input current.

7. The switching regulator of claim 1, wherein the control circuit further includes a modulation circuit, for generating a modulated error signal according to the error signal and a voltage detection signal related to the input voltage; wherein the control signal generation circuit generates the control signal according to the modulated error signal and a current detection signal related to the input current.

8. A switching regulator, comprising:
- a rectifier circuit, for converting an AC power to a rectified power, wherein the rectified power includes an input voltage and an input current;
- a transformer, which includes a primary winding and a secondary winding, wherein the primary winding is for receiving the rectified power, and the secondary winding is for generating an output voltage;
- a power switch, which is coupled to the primary winding, for switching according to an operation signal to convert the rectified power to the output voltage; and
- a control circuit, which is coupled to the power switch, for generating the operation signal according to the rectified power to control the rectified power within a predetermined range, the control circuit including:
  - a power index generation circuit, for generating a power index according to the input voltage and the input current;
  - an amplifier circuit, for generating an error signal according to the power index and a first reference signal;
  - a control signal generation circuit, for generating a control signal according to the error signal;
  - a driver circuit, for generating the operation signal according to the control signal;
  - a low-pass-filter (LPF) circuit, which is coupled to or integrated in the power index generation circuit or the amplifier circuit, for filtering a high frequency band; and
  - an input voltage conversion circuit, for adjusting the first reference signal according to the input voltage.

9. The switching regulator of claim 8, wherein the input voltage conversion circuit includes:
- an input voltage detection circuit, for detecting the input voltage to generate an input voltage detection signal;
- a second voltage-to-current conversion circuit, for generating a second current signal according to the input voltage detection signal; and
- a second current-to-voltage conversion circuit, for generating a second voltage adjustment signal according to the second current signal, wherein the second voltage adjustment signal is combined with the second reference signal to generate the first reference signal.

10. The switching regulator of claim 8, wherein the control circuit further includes a modulation circuit, for generating a modulated error signal according to the error signal and a voltage detection signal related to the input voltage; wherein the control signal generation circuit generates the control signal according to the modulated error signal and a current detection signal related to the input current.

11. A switching regulator, comprising:
- a rectifier circuit, for converting an AC power to a rectified power, wherein the rectified power includes an input voltage and an input current;
- a transformer, which includes a primary winding and a secondary winding, wherein the primary winding is for receiving the rectified power, and the secondary winding is for generating an output voltage;
- a power switch, which is coupled to the primary winding, for switching according to an operation signal to convert the rectified power to the output voltage; and
- a control circuit, which is coupled to the power switch, for generating the operation signal according to the rectified power to control the rectified power within a predetermined range, the control circuit including:
  - a power index generation circuit, for generating a power index according to the input voltage and the input current;
  - an amplifier circuit, for generating an error signal according to the power index and a first reference signal;
  - a control signal generation circuit, for generating a control signal according to the error signal;
  - a driver circuit, for generating the operation signal according to the control signal;
  - a low-pass-filter (LPF) circuit, which is coupled to or integrated in the power index generation circuit or the amplifier circuit, for filtering a high frequency band; and
  - a modulation circuit, for generating a modulated error signal according to the error signal and a voltage detection signal related to the input voltage; wherein the control signal generation circuit generates the control signal according to the modulated error signal and a current detection signal related to the input current.

12. A control circuit of a switching regulator, wherein the switching regulator includes a power switch for switching to convert a rectified power to an output voltage, and wherein the rectified power includes an input voltage and an input current, the control circuit being for controlling the rectified power within a predetermined range, the control circuit comprising:

a power index generation circuit, for generating a power index according to the input voltage and the input current;

an amplifier circuit, for generating an error signal according to the power index and a first reference signal;

a control signal generation circuit, for generating a control signal according to the error signal, to control the power switch;

a low-pass-filter (LPF) circuit, which is coupled to or integrated in the power index generation circuit or the amplifier circuit, for filtering a high frequency band;

an output voltage detection circuit, for generating an output voltage detection signal related to the output voltage; and a compensation circuit, for generating the first reference signal which is inputted to the amplifier circuit according to the output voltage detection signal and a second reference signal.

13. The control circuit of claim 12, wherein the power index generation circuit includes:
an input voltage detection circuit, for detecting the input voltage to generate an input voltage detection signal;
an input current detection circuit, for detecting the input current to generate an input current detection signal; and
a multiplier circuit, for multiplying the input voltage detection signal and the input current detection signal to generate the power index.

14. The control circuit of claim 12, wherein the compensation circuit includes:
a first voltage-to-current conversion circuit, for generating a first current signal according to the output voltage detection signal; and
a first current-to-voltage conversion circuit, for generating a first voltage adjustment signal according to the first current signal, wherein the first voltage adjustment signal is combined with the second reference signal to generate the first reference signal.

15. The control circuit of claim 12, wherein the compensation circuit includes:
a first voltage-to-current conversion circuit, for generating a first current signal according to the output voltage detection signal;
a first current-to-voltage conversion circuit, for generating a first voltage adjustment signal according to the first current signal;
an input voltage detection circuit, for detecting the input voltage to generate an input voltage detection signal;
a second voltage-to-current conversion circuit, for generating a second current signal according to the input voltage detection signal; and
a second current-to-voltage conversion circuit, for generating a second voltage adjustment signal according to the second current signal, wherein the first voltage adjustment signal, the second voltage adjustment signal, and the second reference signal are combined to generate the first reference signal.

16. The control circuit of claim 12 further comprising:
a zero current detection circuit, for detecting a timing when an output current of the switching regulator is zero to generate a zero current detection signal; and
a boundary conduction mode (BCM) control circuit, for adjusting the control signal according to the zero current detection signal to determine a boundary conduction timing of the power switch.

17. The control circuit of claim 16 further comprising a modulation circuit, for generating a modulated error signal according to the error signal and a voltage detection signal related to the input voltage; wherein the control signal generation circuit generates the control signal according to the modulated error signal and a current detection signal related to the input current.

18. The control circuit of claim 12 further comprising a modulation circuit, for generating a modulated error signal according to the error signal and a voltage detection signal related to the input voltage; wherein the control signal generation circuit generates the control signal according to the modulated error signal and a current detection signal related to the input current.

19. A control circuit of a switching regulator, wherein the switching regulator includes a power switch for switching to convert a rectified power to an output voltage, and wherein the rectified power includes an input voltage and an input current, the control circuit being for controlling the rectified power within a predetermined range, the control circuit comprising:
a power index generation circuit, for generating a power index according to the input voltage and the input current;
an amplifier circuit, for generating an error signal according to the power index and a first reference signal;
a control signal generation circuit, for generating a control signal according to the error signal, to control the power switch;
a low-pass-filter (LPF) circuit, which is coupled to or integrated in the power index generation circuit or the amplifier circuit, for filtering a high frequency band; and
a modulation circuit, for generating a modulated error signal according to the error signal and a voltage detection signal related to the input voltage; wherein the control signal generation circuit generates the control signal according to the modulated error signal and a current detection signal related to the input current.

20. A control circuit of a switching regulator, wherein the switching regulator includes a power switch for switching to convert a rectified power to an output voltage, and wherein the rectified power includes an input voltage and an input current, the control circuit being for controlling the rectified power within a predetermined range, the control circuit comprising:
a power index generation circuit, for generating a power index according to the input voltage and the input current;
an amplifier circuit, for generating an error signal according to the power index and a first reference signal;
a control signal generation circuit, for generating a control signal according to the error signal, to control the power switch;
a low-pass-filter (LPF) circuit, which is coupled to or integrated in the power index generation circuit or the amplifier circuit, for filtering a high frequency band; and
an input voltage conversion circuit, for adjusting the first reference signal according to the input voltage.

21. The control circuit of claim 20, wherein the input voltage conversion circuit includes:
an input voltage detection circuit, for detecting the input voltage to generate an input voltage detection signal;
a second voltage-to-current conversion circuit, for generating a second current signal according to the input voltage detection signal; and
a second current-to-voltage conversion circuit, for generating a second voltage adjustment signal according to the second current signal, wherein the second voltage adjustment signal is combined with the second reference signal to generate the first reference signal.

22. The control circuit of claim 20 further comprising a modulation circuit, for generating a modulated error signal according to the error signal and a voltage detection signal related to the input voltage; wherein the control signal generation circuit generates the control signal according to the modulated error signal and a current detection signal related to the input current.

23. A control method for controlling a switching regulator, wherein the switching regulator is for converting a rectified power to an output voltage, and wherein the rectified power includes an input voltage and an input current, the control method comprising:
- generating a power index according to the input voltage and the input current;
- comparing the power index and a first reference signal to generate an error signal;
- generating a control signal for controlling the power switch according to the error signal, such that the rectified power is within a predetermined range;
- filtering a high frequency band;
- wherein the step of generating the control signal further includes:
  - performing a modulation procedure to generate a modulated error signal according to the error signal and a voltage detection signal related to the input voltage; and
  - generating the control signal according to the modulated error signal and a current detection signal related to the input current.

24. A control method for controlling a switching regulator, wherein the switching regulator is for converting a rectified power to an output voltage, and wherein the rectified power includes an input voltage and an input current, the control method comprising:
- generating a power index according to the input voltage and the input current;
- comparing the power index and a first reference signal to generate an error signal;
- generating a control signal for controlling the power switch according to the error signal, such that the rectified power is within a predetermined range;
- filtering a high frequency band;
- generating an output voltage detection signal according to the output voltage; and
- generating the first reference signal according to the output voltage detection signal and a second reference signal.

25. The control method of claim 24, wherein the step of generating the first reference signal includes:
- generating a first converted current signal according to the output voltage detection signal;
- generating a converted voltage signal according to the converted current signal; and
- combining the converted voltage signal with the second reference signal to generate the first reference signal.

26. The control method of claim 25, wherein the step of generating the first reference signal further includes: providing a current for adjusting the first converted current signal, so as to adjust the converted voltage signal.

27. The control method of claim 24, wherein the step of generating the control signal further includes:
- performing a modulation procedure to generate a modulated error signal according to the error signal and a voltage detection signal related to the input voltage; and
- generating the control signal according to the modulated error signal and a current detection signal related to the input current.

28. A control method for controlling a switching regulator, wherein the switching regulator is for converting a rectified power to an output voltage, and wherein the rectified power includes an input voltage and an input current, the control method comprising:
- generating a power index according to the input voltage and the input current;
- comparing the power index and a first reference signal to generate an error signal;
- generating a control signal for controlling the power switch according to the error signal, such that the rectified power is within a predetermined range;
- filtering a high frequency band;
- generating a second converted current signal according to the input voltage;
- generating a second converted voltage signal according to the second converted current signal; and
- combining the second converted voltage signal with the second reference signal to generate the first reference signal.

29. The control method of claim 28, wherein the step of generating the control signal further includes:
- performing a modulation procedure to generate a modulated error signal according to the error signal and a voltage detection signal related to the input voltage; and
- generating the control signal according to the modulated error signal and a current detection signal related to the input current.

30. A control method for controlling a switching regulator, wherein the switching regulator is for converting a rectified power to an output voltage, and wherein the rectified power includes an input voltage and an input current, the control method comprising:
- generating a power index according to the input voltage and the input current;
- comparing the power index and a first reference signal to generate an error signal;
- generating a control signal for controlling the power switch according to the error signal, such that the rectified power is within a predetermined range;
- filtering a high frequency band;
- generating a first converted current signal according to the output voltage;
- generating a first converted voltage signal according to the first converted current signal;
- generating a second converted current signal according to the input voltage;
- generating a second converted voltage signal according to the second converted current signal; and
- combining the first converted voltage signal, the second converted voltage signal, and the second reference signal to generate the first reference signal.

31. The control method of claim 30, wherein the step of generating the control signal further includes:
- performing a modulation procedure to generate a modulated error signal according to the error signal and a voltage detection signal related to the input voltage; and
- generating the control signal according to the modulated error signal and a current detection signal related to the input current.

32. A control method for controlling a switching regulator, wherein the switching regulator is for converting a rectified power to an output voltage, and wherein the rectified power includes an input voltage and an input current, the control method comprising:
- generating a power index according to the input voltage and the input current;
- comparing the power index and a first reference signal to generate an error signal;

generating a control signal for controlling the power switch according to the error signal, such that the rectified power is within a predetermined range;

filtering a high frequency band;

detecting a timing when an output current of the switching regulator is zero to generate a zero current detection signal; and adjusting the control signal according to the zero current detection signal to determine a boundary conduction timing.

33. The control method of claim 32, wherein the step of generating the control signal further includes:

performing a modulation procedure to generate a modulated error signal according to the error signal and a voltage detection signal related to the input voltage; and generating the control signal according to the modulated error signal and a current detection signal related to the input current.

* * * * *